US011783046B2

(12) United States Patent
Dodson et al.

(10) Patent No.: US 11,783,046 B2
(45) Date of Patent: Oct. 10, 2023

(54) ANOMALY AND CAUSATION DETECTION IN COMPUTING ENVIRONMENTS

(71) Applicant: Elasticsearch B.V., Mountain View, CA (US)

(72) Inventors: Stephen Dodson, London (GB); Thomas Veasey, York (GB); David Mark Roberts, London (GB)

(73) Assignee: Elasticsearch B.V., San Francisco, CA (US)

( * ) Notice: Subject to any disclaimer, the term of this patent is extended or adjusted under 35 U.S.C. 154(b) by 774 days.

(21) Appl. No.: 15/855,748

(22) Filed: Dec. 27, 2017

(65) Prior Publication Data

US 2018/0314835 A1   Nov. 1, 2018

Related U.S. Application Data

(63) Continuation-in-part of application No. 15/498,406, filed on Apr. 26, 2017, now Pat. No. 10,986,110.

(51) Int. Cl.
*G06F 21/57* (2013.01)
*G06N 20/00* (2019.01)
(Continued)

(52) U.S. Cl.
CPC .......... *G06F 21/577* (2013.01); *G06F 21/552* (2013.01); *G06N 20/00* (2019.01);
(Continued)

(58) Field of Classification Search
CPC ................ G06F 21/577; G06F 21/552; G06F 2221/034; G06N 20/20; G06N 20/00; G06N 5/025; G06N 5/046; H04L 63/1425
See application file for complete search history.

(56) References Cited

U.S. PATENT DOCUMENTS 6,012,152 A   1/2000  Douik et al.
7,280,988 B2  10/2007  Helsper et al.
(Continued)

FOREIGN PATENT DOCUMENTS

EP   3616062 A1   3/2020
EP   3616096 A1   3/2020
(Continued)

OTHER PUBLICATIONS

Varun Chandola, "Anomaly Detection: A Survey", ACM Comput. Surv. 41, 3, Article 15 (Jul. 2009), 58 pages. (Year: 2009).*
(Continued)

*Primary Examiner* — Michael J Huntley
*Assistant Examiner* — Imad Kassim
(74) *Attorney, Agent, or Firm* — Quinn IP Law

(57) ABSTRACT

Anomaly detection in computing environments is disclosed herein. An example method includes receiving an unstructured input stream of data instances from the computing environment, the unstructured input stream being time stamped; categorizing the data instances of the unstructured input stream of data instances, the data instances comprising at least one principle value and a set of categorical attributes determined through machine learning; generating anomaly scores for each of the data instances collected over a period of time; and detecting a change in the categorical attribute that is indicative of an anomaly.

17 Claims, 11 Drawing Sheets

(51) Int. Cl.
  *G06F 21/55* (2013.01)
  *G06N 20/20* (2019.01)
  *G06N 5/025* (2023.01)
(52) U.S. Cl.
  CPC ....... *G06N 20/20* (2019.01); *G06F 2221/034* (2013.01); *G06N 5/025* (2013.01)

(56) References Cited

U.S. PATENT DOCUMENTS

| | | | |
|---|---|---|---|
| 7,310,590 | B1 | 12/2007 | Bansal |
| 7,451,210 | B2 | 11/2008 | Gupta et al. |
| 7,539,593 | B2 | 5/2009 | Machacek |
| 7,881,535 | B1 | 2/2011 | McLaughlin et al. |
| 8,027,439 | B2 | 9/2011 | Zoldi et al. |
| 8,324,260 | B1 | 12/2012 | Garcia da Rocha et al. |
| 9,038,172 | B2 | 5/2015 | Miller et al. |
| 9,224,067 | B1 | 12/2015 | Lu et al. |
| 9,314,449 | B2 | 4/2016 | Garcia da Rocha et al. |
| 9,407,651 | B2 | 8/2016 | Mathis |
| 9,516,053 | B1 | 12/2016 | Sudhakar et al. |
| 10,986,110 | B2 | 4/2021 | Dodson et al. |
| 11,017,330 | B2 | 5/2021 | Dodson |
| 2001/0000192 | A1 | 4/2001 | Gonzalez et al. |
| 2003/0065409 | A1 | 4/2003 | Raeth et al. |
| 2003/0101076 | A1 | 5/2003 | Zaleski |
| 2005/0080806 | A1 | 4/2005 | Doganata et al. |
| 2006/0020924 | A1 | 1/2006 | Lo et al. |
| 2006/0167917 | A1 | 7/2006 | Solomon |
| 2008/0021994 | A1 | 1/2008 | Grelewicz et al. |
| 2008/0071638 | A1 | 3/2008 | Wanker |
| 2008/0114725 | A1 | 5/2008 | Indeck et al. |
| 2009/0077663 | A1 | 3/2009 | Sun et al. |
| 2009/0106178 | A1 | 4/2009 | Chu |
| 2009/0177692 | A1 | 7/2009 | Chagoly et al. |
| 2009/0254312 | A1 | 10/2009 | Kube et al. |
| 2011/0078106 | A1 | 3/2011 | Luchi et al. |
| 2011/0145400 | A1 | 6/2011 | Dodson |
| 2011/0149745 | A1* | 6/2011 | Filho .................. H04L 63/1416 370/242 |
| 2012/0137367 | A1 | 5/2012 | Dupont et al. |
| 2013/0031130 | A1 | 1/2013 | Hahm |
| 2013/0198206 | A1 | 8/2013 | Jones |
| 2013/0238476 | A1* | 9/2013 | Green .................. G06Q 40/06 705/35 |
| 2013/0262347 | A1 | 10/2013 | Dodson |
| 2013/0325584 | A1 | 12/2013 | Bogaty et al. |
| 2013/0326620 | A1 | 12/2013 | Merza et al. |
| 2014/0006330 | A1* | 1/2014 | Biem .................. G06F 21/552 706/46 |
| 2014/0108640 | A1 | 4/2014 | Mathis |
| 2015/0047026 | A1 | 2/2015 | Neil et al. |
| 2015/0058982 | A1 | 2/2015 | Eskin et al. |
| 2015/0082437 | A1 | 3/2015 | Dodson |
| 2015/0180894 | A1* | 6/2015 | Sadovs .................. H04L 67/22 726/22 |
| 2015/0235312 | A1 | 8/2015 | Dodson |
| 2015/0302310 | A1 | 10/2015 | Wernevi et al. |
| 2015/0339600 | A1 | 11/2015 | Dodson |
| 2016/0055654 | A1* | 2/2016 | Flanders .............. G06K 9/6214 382/162 |
| 2016/0142435 | A1 | 5/2016 | Bernstein et al. |
| 2016/0226901 | A1 | 8/2016 | Baikalov et al. |
| 2017/0063910 | A1* | 3/2017 | Muddu ................. G06F 16/444 |
| 2017/0148096 | A1 | 5/2017 | Dodson |
| 2018/0173698 | A1* | 6/2018 | Dubey ................... G06F 40/30 |
| 2018/0314965 | A1 | 11/2018 | Dodson et al. |
| 2021/0194910 | A1 | 6/2021 | Dodson et al. |

FOREIGN PATENT DOCUMENTS

| | | |
|---|---|---|
| WO | WO2012154657 A2 | 11/2012 |
| WO | WO2018200111 A1 | 11/2018 |
| WO | WO2018200112 A1 | 11/2018 |
| WO | WO2018200113 A1 | 11/2018 |

OTHER PUBLICATIONS

Goldstein et al., "A Comparative Evaluation of Unsupervised Anomaly Detection Algorithms for Multivariate Data", PLoS ONE, Published: Apr. 19, 2016. (Year: 2016).*

Ferguson et al. ("Anomalies in real and counterfactual worlds: An eye-movement investigation", Journal of Memory and Language 58 (2008) 609-626, 2007) (Year: 2007).*

Sundararajan et al. ("Gradientsofcounterfactuals", ICLR2017) (Year: 2017).*

Meilă, Marina, "Comparing Clustering—An Information Based Distance," Journal of Multivariate Analysis 98, 2007, pp. 873-895.

"International Search Report" and "Written Opinion of the International Searching Authority," Patent Cooperation Treaty Application No. PCT/US2018/024660, dated Jun. 26, 2018, 9 pages.

Domingues, Remi, "Machine Learning for Unsupervised Fraud Detection," Royal Institute of Technology, School of Computer Scienece and Communication, KTH CSC, SE-100 44 Stockholm, Sweden, 2015 [retrieved on May 21, 2018], Retrieved from the Internet: <URL:http://www.diva-portal.org/smash/get/diva2:897808/FULLTEXT01.pdf>, 66 pages.

"International Search Report" and "Written Opinion of the International Searching Authority," Patent Cooperation Treaty Application No. PCT/US2018/024671, dated Jul. 27, 2018, 15 pages.

Chandola, Varun et al., "Anomaly Detection: A Survey," ACM Computing Surveys, Aug. 15, 2007, pp. 1-72, Retrieved from the Internet: <URL:http://www.cs.umn.edu/sites/cs.umn.edu/files/tech_reports/07-017.pdf>.

"International Search Report" and "Written Opinion of the International Searching Authority," Patent Cooperation Treaty Application No. PCT/US2018/024613, dated Jun. 1, 2018, 10 pages.

"Extended European Search Report", European Patent Application 18790780.3, dated Sep. 10, 2020, 6 pages.

Soule et al., "Combining Filtering and Statistical Methods for Anomaly Detection", USENIX, The Advanced Computing Systems Association, Oct. 24, 2005, pp. 1-14.

"Extended European Search Report", European Patent Application 18791513.7, dated Sep. 14, 2020, 9 pages.

Domingues et al., "Machine Learning for Unsupervised Fraud Detection", Stockholm, Sweden 2015, Kth Royal Institute of Technology School of Computer Science and Communication, Second Cycle (Year: 2015), 66 pages.

Riveiro et al., "Improving maritime anomaly detection and situation awareness through interactive visualization", IEEE Xplore, Sep. 26, 2008, 8 pages.

Spiliopoulou et al., "MONIC—Modeling and Monitoring Cluster Transitions", ACM, KDD'06, Aug. 20-23, 2006, 6 pages.

"Office Action", European Patent Application No. 18791513.7, dated Mar. 8, 2022, 4 pages.

Zhang, "Sliding Window-Based Fault Detection From High-Dimensional Data Streams", IEEE Transactions on Systems, Man, and Cybernetics: Systems, vol. 47, No. 2, Feb. 2017, 15 pages.

* cited by examiner

600

Jan 25 16:54:22 10.220.4.3 Jan 25 16:54:22 DC02-LBSSNAT-
04 snmpd[5071]: error on subcontainer 'ia_addr' insert (-1)

602

Jan 25 16 54 22 10.220.4.3 Jan 25 16 54 22 DC02-LBSSNAT-
04 snmpd 5071 error on subcontainer ia_addr insert 1

604

DC02-LBS-SNAT-04 snmpd error on subcontainer ia_addr insert

Info Service IA_FTSPOS starting

704

Info Service IA_FTSPOS started

Example Weightings:

Info → 3
Service → 3
IA_FTSPOS → 1
starting → 6
started → 6

18/05/2011 15:33:57 A TCPCOM2 AJBSVC2 :
Connected to remote 127.0.0.1 (17)

804

18/05/2011 15:33:59 A 65612 AJBSVC4 :
Connected to remote 127.0.0.1 (16)

806

A TCPCOM2 AJBSVC2 Connected to remote

808

A AJBSVC4 Connected to remote

2017-12-14T00:39:33 <prelert-sol: Info: > Source TEST_SERVICE2 on 33122:967 has shut down.

2017-12-14T00:39:34 <prelert-sol: > Source EUROBROKER on 33112:836 has shut down.

2017-12-14T00:40:05 <prelert-lnl: Info: > Source TEST_LIQUIDNET on 33188:1010 has shut down.

2017-12-14T00:40:05 <prelert-sol: Info: > Source TEST SERVICE2 on 33122:967 has shut down.

2017-12-14T00:41:12 <prelert-sol: Info: > Source EUROBROKER on 33112:836 has started.

2017-12-14T00:41:23 <prelert-sol: Info: > Source TEST_SERVICE2 on 33122:967 has started.

2017-12-14T00:41:24 <prelert-lnl: Info: > Service TESTX, id of 732, has started.

2017-12-14T00:41:24 <prelert-sol: Info: > Service TESTM, id of 632, has started.

2017-12-14T00:41:26 <prelert-sol: Info: > Service TESTM, id of 632, has started.

2017-12-14T00:41:26 <prelert-lnl: Info: > Service TESTX has shut down.

1004 category 1 - 2017-12-14T00:39:33 <prelert-sol: Info: > Source TEST_SERVICE2 on 33122:967 has shut down.

category 1 - 2017-12-14T00:39:34 <prelert-sol: > Source EUROBROKER on 33112:836 has shut down.

category 1 - 2017-12-14T00:40:05 <prelert-lnl: Info: > Source TEST_LIQUIDNET on 33188:1010 has shut down.

category 1 - 2017-12-14T00:40:05 <prelert-sol: Info: > Source TEST SERVICE2 on 33122:967 has shut down.

category 2 - 2017-12-14T00:41:12 <prelert-sol: Info: > Source EUROBROKER on 33112:836 has started.

category 2 - 2017-12-14T00:41:23 <prelert-sol: Info: > Source TEST_SERVICE2 on 33122:967 has started.

category 2 - 2017-12-14T00:41:24 <prelert-lnl: Info: > Service TESTX, id of 732, has started.

category 3 - 2017-12-14T00:41:24 <prelert-sol: Info: > Service TESTM, id of 632, has started.

category 3 - 2017-12-14T00:41:26 <prelert-sol: Info: > Service TESTM, id of 632, has started.

category 4 - 2017-12-14T00:41:26 <prelert-lnl: Info: > Service TESTX has shut down.

ANOMALY AND CAUSATION DETECTION IN COMPUTING ENVIRONMENTS

CROSS REFERENCE TO RELATED APPLICATIONS

This application is a continuation-in-part of U.S. application Ser. No. 15/498,406, filed on Apr. 26, 2017, which is hereby incorporated by reference herein in its entirety, including all references and appendices cited therein, for all purposes. This application is also related to U.S. patent application Ser. No. 15/857,186, which is hereby incorporated by reference herein in its entirety, including all references and appendices cited therein, for all purposes.

FIELD OF THE PRESENT TECHNOLOGY

The present technology relates generally to digital security, and more particularly, but not by limitation, to systems and methods that detect anomalies in computing environments that are indicative of malicious or otherwise unwanted behavior within, or performed by, the computing environment. This anomaly detection process is enhanced using methodologies for detecting and isolating sources of the anomalies. These methods and systems include processes for using unstructured log files to detect computing environment anomalies.

SUMMARY

Various embodiments of the present technology include a method for detecting anomalous activity in a computing environment, the method comprising: receiving an unstructured input stream of data instances from the computing environment, the unstructured input stream being time stamped; categorizing the data instances of the unstructured input stream of data instances, the data instances comprising any of a principal value or a categorical attribute determined through machine learning; generating anomaly scores for each of the data instances collected over a period of time; and detecting a change in the categorical attribute that is indicative of an anomaly.

Various embodiments of the present technology include a method for detecting anomalous activity in a computing environment, the method comprising: receiving an unstructured input stream of data instances, the data instances in the unstructured input stream being time stamped; categorizing the data instances of the unstructured input stream of data instances, the data instances comprising any of a principal value or a categorical attribute determined through machine learning; grouping the data instances into groups based on continuous time intervals, each of the continuous time intervals having a length; applying set functions to each of the groups; and generating an anomaly score for each of the groups using the set functions.

Various embodiments of the present technology include a system for detecting anomalous activity in a computing environment, the system comprising: receiving an unstructured log file of a computing environment, the unstructured log file comprising temporal data; tokenizing segments within the unstructured log file; filtering or removing a portion of the tokenized segments based on a set of filtering criteria; applying a weight to one or more of the filtered, tokenized segments; comparing the filtered, tokenized segments to one another to determine if a match exists there between; and categorizing the filtered, tokenized segments based on the comparison.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 6 illustrates a process for converting an unstructured log file message/segment into a tokenized segment, and further into a tokenized and filtered segment.

FIG. 7 illustrates an example process for calculating and applying a weight to tokens in two filtered, tokenized segments.

FIG. 8 illustrates a process for comparing unstructured log file messages/segments and their corresponding filtered, tokenized segments.

FIG. 10 illustrates an example best match weighting selection data set.

DETAILED DESCRIPTION

The present disclosure is directed to various embodiments of systems and methods that use unsupervised machine learning to detect anomalous activity and isolate a source or sources thereof. In more detail, an input stream of data instances is received. The input stream can include data instances of behavior or activity of a computer environment. Generally, a computer environment can include an individual computing system as well as a plurality of computers or other computing devices such as a network. The input stream can be obtained from any method that would be known to one skilled in the art.

In various embodiments, the data instances are obtained over a period of time and each of the data instances are time stamped. Various analyses described herein examine the data instances over all or a portion of the period of time for which the input stream is collected. Anomalies can be detected within this input stream by examining and comparing principal values (or at least one principal value) and their corresponding categorical attributes as they changed over time. These changes are identified as anomalies, according to various embodiments. Further inspection of the anomalies may confirm or eliminate the anomalies as indicative of malicious behavior or other computing environment issues.

In accordance with various embodiments of the present disclosure, when an anomaly is detected, a cause or causes of the anomaly are located through a process of counterfactual processing. An exemplary process of counterfactual processing uses reductionism and elimination to isolate principal values and/or corresponding categorical attributes that contribute to the anomaly. In various embodiments, these anomalous principal values and/or corresponding categorical attributes are then traced back to a source such as a user, a computing system, a network component, or the like (generally referred to as a source point). This source point can then be identified and flagged for further review. In some embodiments, the source point is automatically remediated. For example, if the source point is a computing system and the anomaly that is detected is a spike in traffic between the computing system and a foreign server, the remediation can comprise automatically blocking network access for the computing system until a full review of the computing system has been conducted.

These and other advantages of the present technology are provided below with reference to the collective drawings.

Figure 1:
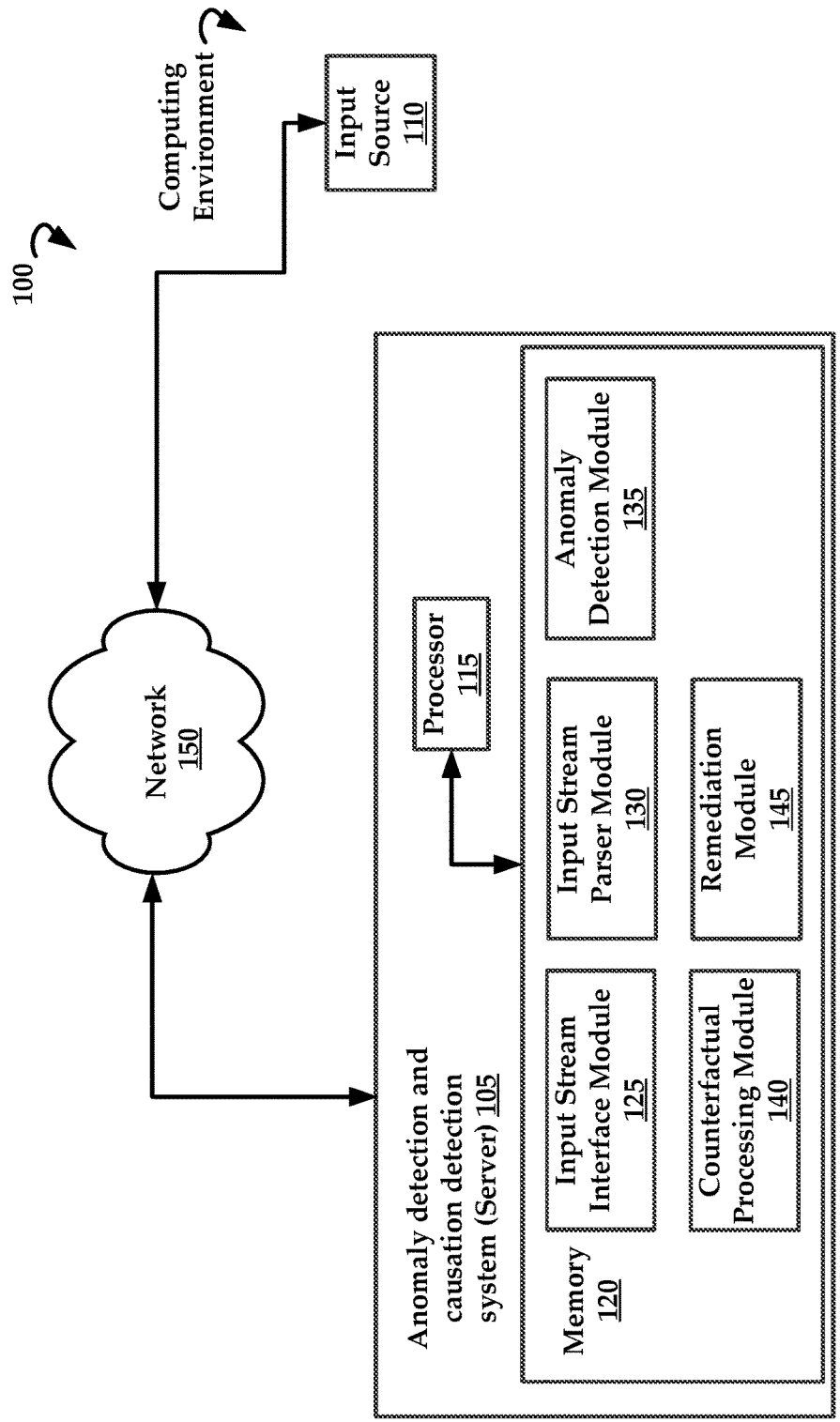
FIG. 1 is a high level schematic diagram of computing architecture for practicing aspects of the present technology.

FIG. 1 is a high level schematic diagram of an exemplary computing architecture (hereinafter architecture 100) of the present technology. The exemplary architecture 100 comprises an exemplary anomaly detection and causation detection system 105 (hereinafter also referred to as exemplary system 105 or system 105 for short), which in some embodiments comprises a server or cloud-based computing device configured specifically to perform the analyses described herein. That is, the system 105 in some embodiments is a particular purpose computing device that is specifically designed and programmed (e.g., configured or adapted) to perform any of the methods described herein. The system 105 can also comprise a plurality of distributed computing systems that cooperatively provide the features of the system 105. For example, individual ones of the plurality of distributed computing systems can provide one or more unique functions or services. In some embodiments, the system 105 can comprise a cloud computing environment or other similar networked computing system.

The system 105 can be coupled with an input source 110 that provides an input stream to the system 105. An input source 110 can comprise, for example, a computing system, an enterprise network, a plurality of computing systems arranged as a network, virtual machines, application(s), network tap(s), services, a cloud, containers, or other similar computing environment that creates data instances. In some embodiments, the input source 110 comprises a database or data store that stores pre-obtained data from any of the aforementioned sources for use in accordance with the present disclosure.

In one embodiment, the system 105 comprises a processor 115 and memory 120 for storing instructions. The memory 120 can include an input stream interface module 125, an input stream parser module 130, an anomaly detection module 135, a counterfactual processing module 140, and a remediation module 145. As used herein, the terms "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

In some embodiments, the system 105 receives an input stream from the input source 110 via the input stream interface module 125. An input stream may include a plurality of data instances that are collected over a period of time. The individual data instances (or components thereof) may be time stamped so that a chronological order can be maintained for the data instances.

In some embodiments, using unsupervised machine learning, the exemplary system 105 can evaluate the data instances over time to detect anomalous behavior. In general, anomalous behavior can include any deviation in the data instances as viewed over time. For example, if the data instances are collected for a network such as a cloud, changes in resource utilization of a service within the cloud can be identified as anomalous. In another example, a brief spike in file transfer rates between a computing device and another computing device (possibly in a foreign country) can be flagged as anomalous. The present disclosure is not intended to be limited to unsupervised machine learning and in some embodiments can incorporate other machine learning methods. In one embodiment, user feedback can be incorporated into an anomaly score via supervised machine learning techniques, or at least partially supervised or a mixture that is based on how unusual the deviation/anomaly is relative to models of historical behavior of the system 105, as well as how it compares to other anomaly instances that have been indicated as important.

The use of unsupervised machine learning in various embodiments allows the system 105 to evaluate only the data instances available and examine these data instances for anomalous behavior in a self-referential manner. That is, in various embodiments, the data instances are modeled for the time period for which data instances are collected and these data instances are used without referencing pre-generated behavior profiles or other similar profiles. The use of pre-generated behavior profiles may be advantageous in some embodiments, if available, but these profiles are not required.

Changes in data instances over time can be flagged as anomalous if the changes have a magnitude that is unexpected. The exemplary system 105 need not rely on rigid thresholds or rules for determining if changes in the data instances are anomalous, but such information can be used to confirm or validate the anomaly. In some embodiments, the system 105 can calculate a probability of a current behavior based on historical behavior, where low probability events are classified as anomalies. Again, the use of thresholds or rules is not required, but is also not prohibited.

In various embodiments, each data instance is comprised of at least one principal value that represents an aspect or object of the computing environment that is to be measured for anomalies. Non-limiting examples of principal values include network traffic volume, memory access and/or usage, processor usage rates, file transfer, file access, device access, and so forth. In various embodiments, the at least one principal values selected can be a subset of all available principal values in the data instances. The principal values selected for the data instances can be user-selected or user-defined, or can be based on prior knowledge, such as prior instances of anomalous network activity. For example, if prior anomalies in increased CPU usage in a cloud were linked to malicious behavior, the principal values could include CPU usage aspects.

In other embodiments, the data instances can be selected based on pre-defined understanding of the data type, or automatically by the system 105 based on data characteristics.

In some embodiments, a principal value comprises corresponding categorical attributes and values thereof. In one example, if the principal value is "log on time", categorical attributes could include users, system ID, login locations, and so forth.

When the input stream is received, the exemplary input stream parser module 130, shown in the example in FIG. 1, may be executed to separate or parse the input stream into data instances that are ordered in time. That is, in various embodiments, the data instances are collected over a period of time and time stamped as noted above. The input stream parser module 130 can determine the influence that instances of the collected data have on the computing environment using the principal values v (or at least one principal value) and corresponding set of categorical attributes $[a_j^i]$. In various embodiments, the input stream parser module 130 considers the data as a collection $\{d_i=(v_i, a_i^1, a_i^2, \ldots, a_i^n)\}$, where data represented by { } includes a set. Again, using the example above, a principal value v is log on time and two categorical attributes $a_j^1 \in \{jim, jill, greg\}$, which are indicative of users and $a_j^2 \in \{home, work\}$, which are indicative of a location. Additional or fewer categorical attributes can be considered. In various embodiments, the input stream parser module 130 converts the principal value and categorical attributes into a collection of sets (8:50 am, jim, work); (7:40 am, jill, work); and (6:45 pm greg, home). Other similar tuples can be created for other types of data sets, and can include a combination of numerical and/or non-numerical values.

In some embodiments, anomaly influence aims to understand the way that the categorical attributes are influencing the anomalies that are located by analyzing the principal value v.

Anomaly detection as disclosed in various embodiments herein involves the comparison and evaluation of the at least one principal value changing over time. According to some embodiments, once sets are created from the data instances, the anomaly detection module 135 is executed to detect anomalies for the data: $\mathcal{D}=\{(t_i, d_i)\}$.

In various embodiments, the anomaly detection module 135 creates features in order to perform anomaly detection by bucketing (e.g., grouping) the data instances into continuous time intervals, where a kth bucket or group is defined according to the equation: $\mathcal{B}_k=\{(t_i,d_i)\in\mathcal{D}: t_i \geq kL, t_i<(k+1)L\}$ where L is a bucket length (e.g., time frame or portion of total time for which data instances were collected).

The anomaly detection module 135 then applies one or more set functions $f: \mathcal{U} \to \mathbb{R}$ where $\mathcal{U} \subset \{v_i:(t_i, (v_i, \ldots )) \in \mathcal{D}\}$ to generate a set of features. The value of a feature for the kth bucket is thus $f(\mathcal{B}_k)$. In one example, if $v_i$ are numerical, the set function is a mean that is calculated using: $f=1/|\mathcal{U}|\sum_\mathcal{U} v_i$; whereas if $v_i$ are categorical, the set function selected is a count $f=|\mathcal{U}|$; and alternatively if $v_i$ are categorical, the set function is a distinct count $f=|\{[v_i]\}|$, where [*] denotes its arguments equivalence class. Thus, the principal value can include any of numerical values, categorical values, combinations thereof, or other similar principal value types that would be known to one of ordinary skill in the art with the present disclosure before them. Examples of a numerical principal values as provided above would include 8:50 (am), 100 (gigabits of data), 30 (memory access operations), 80% (CPU usage), and so forth. Examples of categorical principal values include names, locations, or other non-numerical data.

The anomaly detection module 135, in the above example, then applies a suitable anomaly detection algorithm to the bucketed data instances.

In various embodiments, the suitable anomaly detection algorithm will take as inputs bucket features $\{f(\mathcal{B}_i)\}$ for buckets chronologically earlier in time than a current bucket j, i.e., for i<j, and then generate an anomaly score which corresponds to how anomalous is the value $f(\mathcal{B}_j)$ for the current bucket j. The operation for the exemplary algorithm can be expressed as $(f(\mathcal{B}_j), \{f(\mathcal{B}_i:i<j\}) \mapsto s$ where s is the anomaly score.

In various embodiments, an exemplary anomaly detection algorithm tries to predict a distribution for a new feature value based on relevant historical data and the time the feature value occurs. The exemplary anomaly detection algorithm can account for multiple effects, such as slowly changing level, periodic patterns, weekday/weekend differences and recurrent patterns that relate to the calendar. For example, if a prediction is being made for 10 am on Monday morning, the anomaly distribution algorithm will estimate the probability distribution of values for the feature based on historical behavior for Monday mornings around that time and may also account for differences between days of the month or Mondays of the month. In some embodiments, a test is made to check if there is a statistically significant over occurrence of large predictions errors which coincide with a particular calendar feature. For example, it is expected on average there to be "n"×"p"/100 "p" percentile prediction errors given "n" predictions. Furthermore, (assuming independence), this must follow a binomial distribution. Therefore, the exemplary algorithm can calculate the chance of seeing a given count (or higher) of large prediction errors for a particular day of month, day of week and week of month, say the 2nd Monday of each month, and so on. In various embodiments, if this chance is small then it is typically appropriate to estimate a correction to the predicted distribution which depends on this feature, i.e., correct the predictions with information about previous of the same type of calendar day.

In order to understand what the impact of one of the categorical attributes is on an anomaly, it is noted that the distinct values of the attribute create a partition of the data instances in the bucket, i.e., the data instances for which the ith categorical attribute is $a_j^i$ is an equivalence class defined by:

$[a_j^i]_k=\{(t_i,d_i)\in\mathcal{B}_k: d_i=(v_i, a_*^1, \ldots, a_j^i, \ldots, a_*^n)\}$. For example, $a_*^1$ denotes any value from the set of possible values for the first type of categorical attribute. Examples of the type of categorical attribute include user and location.

Using the aforementioned algorithms and the separation of data instances by their categorical attributes, the exemplary counterfactual processing module 140 may selectively remove portions of the data instances corresponding to each categorical attribute, recalculate the anomaly scores, and determine if removal of the categorical attributes reduces or removes the anomaly. If removal does reduce or remove the anomaly, it can be determined that the object of the computing environment responsible for producing the removed categorical attributes is likely a source (could be one of many) for the anomaly. This process, in various embodiments, does not categorize the detection of an anomaly as a malicious or nefarious event, but instead detects the anomaly and flags associated portions of the computing environment for further consideration or review.

In various embodiments, the counterfactual processing module 140 can provide a mechanism for asking and answering questions such as, for example, what would the situation be like if all the data labelled with a given attribute were removed, or what it would be like if all the data except that labelled with a given attribute were removed.

In various embodiments, these counterfactual processing can be executed very efficiently depending on the function. For example, to do this process for a mean (e.g., numerical principal value) the system 105 is not required to store all the data in a bucket, but only additionally maintain a count and mean of values for each distinct value of each categorical attribute. Specifically, for each equivalence class we need $|[a_j^i]_k|$ and $$1/|[a_j^i]_k| \sum_{(t_i, d_i) \in [a_j^i]_k} v_i.$$

This counterfactual approach for understanding causation, according to various embodiments, falls under logical principles of "if B does not happen, C does not happen" and thus "B causes C" by logical extension. Specifically, for certain types of set functions (e.g., countably additive functions) it is understood that the attribute a1 influences an anomaly for the bucket $\mathcal{B}_k$ if the output of the anomaly detection algorithm (e.g., a score of the bucket), is that the bucket is less anomalous in the alternative world in which the only thing that changed is that all the data instances labeled with a) are removed. Stated another way, various embodiments ask whether the anomaly scores are lower when a portion of the data instances with specific categorical attributes are removed and the remaining data instances are rescored. If yes, the specific categorical attributes whose data instances were removed likely contributed to the discrepant anomaly score.

In general, counterfactual reasoning agrees with knowledge available for countably additive functions like count or sum. For example, if it is observed first that the count is unusually high, and then observed that, if a particular category had not occurred, the count is normal. In this example, it seems reasonable to conclude that the "behavior" of that particular category caused the anomalous score.

For other types of set functions, for example, where the presence of a single example data instance can cause an anomaly of a similar score, then the system 105 may use a regularity approach for understanding causation (i.e. "B causes C" if "whenever B occurs C occurs"). More specifically, it is known that the categorical attribute $a_j^i$ influences an anomaly score of a bucket $\mathcal{B}_k$ if the output of an anomaly detection algorithm (i.e., score of the bucket) is roughly the same in all alternative worlds (such as removing any subset of the data instances which are not labeled with a)) in which all the data instances labeled a) exist (e.g., whenever B occurred, C also occurred).

Examples of such set functions include determining maximum or minimum values of the principal values in the bucket, i.e., $\max\{v_i: (t_i, (v_i, \ldots) \in \mathcal{B}_k\}$ and $\min\{v_i:(t_i, (v_i, \ldots) \in \mathcal{B}_k\}$. For example, the system 105 may determine that a bucket minimum is unusually low and that the bucket minimum coincides with a particular categorical attribute. In that case, it seems reasonable to conclude that the "behavior" of that categorical attribute caused the anomalously low score in this example.

These exemplary processes above can be generally referred to as a process for creating and using a behavioral profile of a computing environment. In various embodiments, the behaviors of the computing environment are assessed for anomalous activity/behaviors.

Once an anomaly has been detected and a cause or causes isolated, the remediation module 145 may be executed to remediate the cause or causes in some embodiments. In various embodiments, the specific methods by which the remediation module 145 remediates a cause are highly dependent upon the type of anomaly detected. For example, if the anomaly includes a high rate of access to a particular database, the remediation module 145 may restrict access privileges for the database until the anomaly is reviewed. If the anomaly is unusually frequent file transfers (e.g., exfiltration) of high volumes of data outside a protected network, the remediation module 145 may restrict file transfers by specifically identified machines in the network. This could occur through changing firewall policies or preventing access to any external network by the machines.

In sum, the present disclosure provides various embodiments of systems and methods to detect anomalies within computing environments and deduce the cause or causes of those anomalies. The systems and methods can detect unusual events, rates, metrics and so forth for any computing environment. In some embodiments, multiple anomalies can be present and detected by the systems and methods herein. For example, the systems and methods can detect both exfiltration of data and excessive login attempts.

Figure 2:
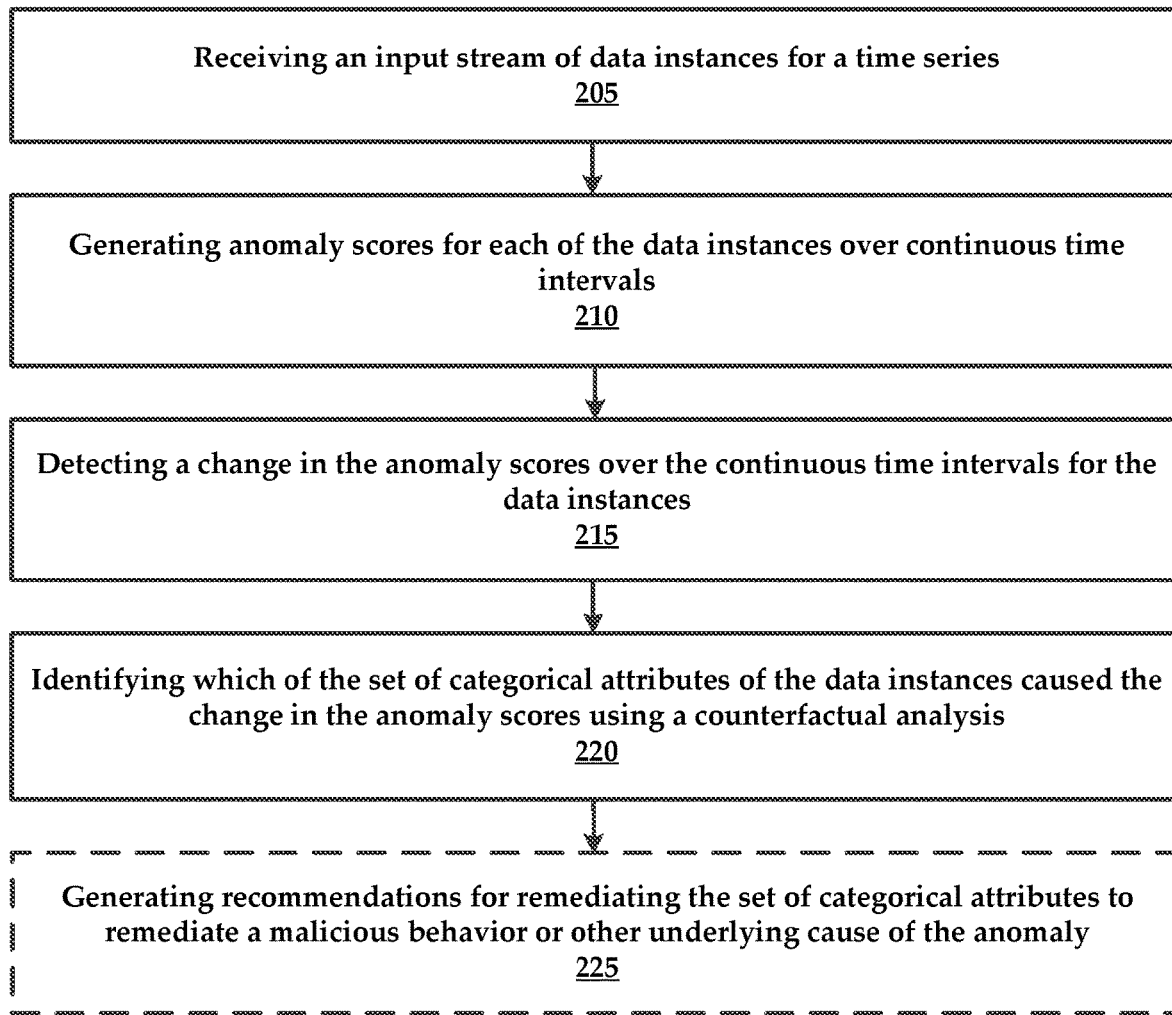
FIG. 2 is a flowchart of an example method for detecting anomalous activity in a computing environment and determining a cause(s) thereof.

FIG. 2 is a flowchart of an example method 200 of detecting anomalous activity in a computing environment and determining one or more causes for the anomalous activity. The example method 200 comprises a step 205 of receiving an input stream of data instances for a time series. For example, an input stream can be received from a computing environment. The time series can include any span of time desired. The method includes evaluating the input stream that includes data that spans over a period of time. The example method 200 can involve using unsupervised machine learning, inasmuch as the data utilized is that which is included in the input stream only. That is, the entirety of the analysis, in some embodiments, involves the input stream without using pre-determined or pre-configured metrics for assessing the data instances of the input stream.

In some embodiments, the data instances of the input stream are time stamped. The data instances also comprise at least one principal value, and each principal value comprises a set of categorical attributes.

After the input stream is received, the example method 200 includes a step 210 of generating anomaly scores for each of the data instances over continuous time intervals. That is, the data instances may be scored in a chronological manner such that anomaly scores along the timeline are calculated. The example method 200 then includes a step 215 of detecting a change in the anomaly scores over the continuous time intervals for the data instances. Stated otherwise, the example method 200 examines the scores calculated for the buckets of data instances (as described above) and locates variances in the scores that are indicative of an anomaly. In some embodiments, the user can specify how much scores can deviate over time before the deviations are flagged as an anomaly. For example, if the principal value is network traffic volume, and the network traffic volume rates change only slightly (e.g., +/−5%), these discrepancies in network traffic volume are not anomalous, whereas a change of more than 10% may be flagged as anomalous.

In various embodiments, an anomaly score is a normalized measure of how big the deviation is, and the larger the score the more unusual the deviation. In some embodiments, the system 105 characterizes historical deviations using a density function, i.e., a chance f(x) of seeing a deviation x in the value of the set function. The anomaly score, in some embodiments, is related to the chance of seeing a deviation which is at least as unlikely, i.e. the total chance of seeing any value y for which $f(y)<f(x)$. A fixed cutoff on the anomaly score can be utilized, i.e., an anomaly is something which should occur rarely based on historical data, so has a score greater than a fixed threshold. The score may therefore amount to a dynamic threshold since it is based on the data characteristics. In various embodiments, the system 105 separately and precisely controls the rate at which the system 105 generate alerts at a specific severity based on the anomaly score, i.e., the system 105 does not allow this to exceed (over a very long time frame, although it can exceed it for shorter time frames) more than a certain value. Higher severity alerts are allowed less frequently, according to some embodiments.

Figure 3:
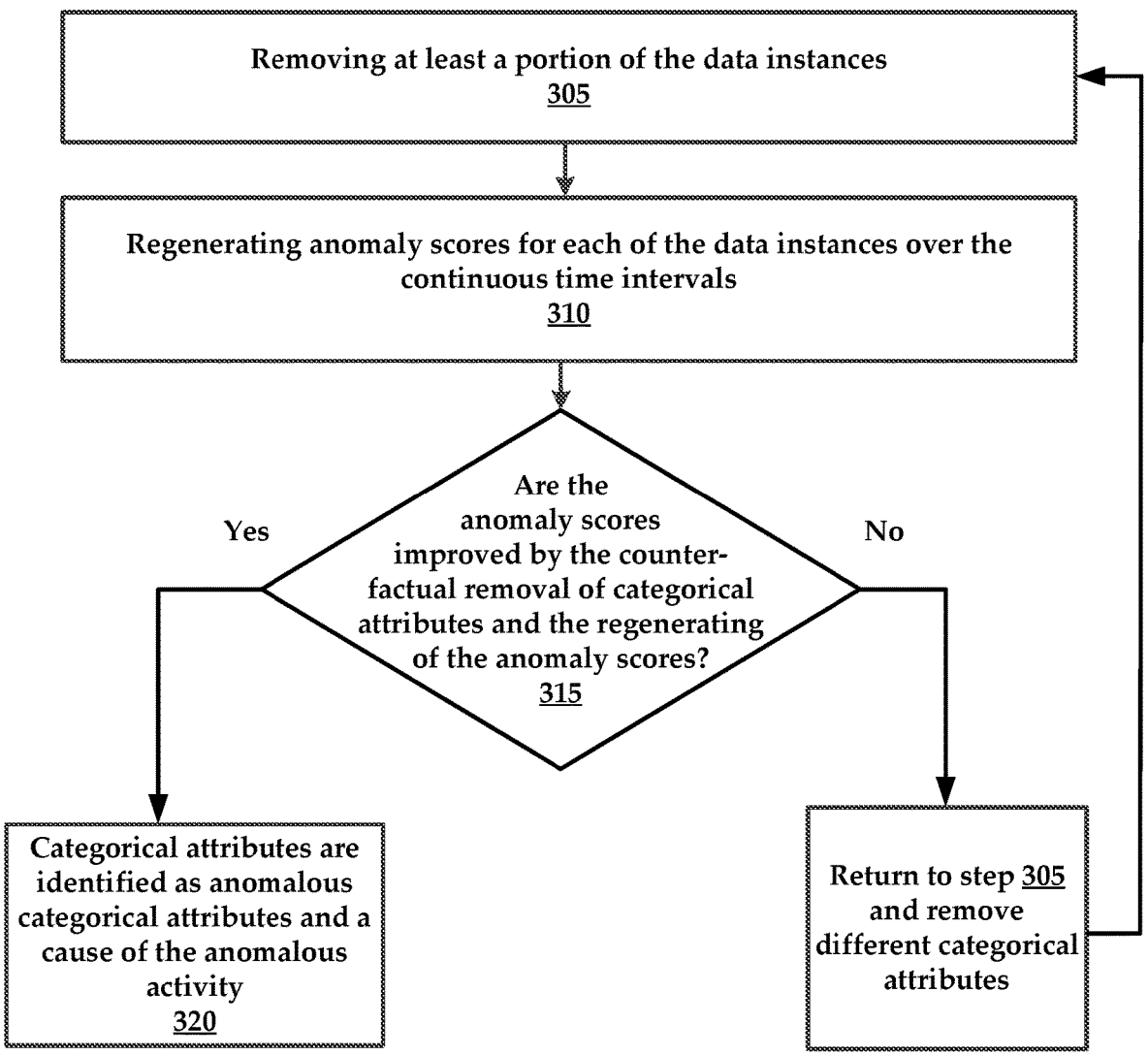
FIG. 3 is a flowchart of an example method of counterfactual analysis for determining a cause or causes of an anomalous activity.

The example method 200 includes a step 220 of identifying which of the set of categorical attributes of the data instances caused the change in the anomaly scores using a counterfactual analysis. FIG. 3 illustrates an example method 300 of counterfactual analysis.

In some embodiments, the example method 200 can include an optional step 225 of generating recommendations for remediating the set of categorical attributes to remediate a malicious behavior or other underlying cause of the anomaly. For example, the system can suggest that users not be allowed to log in from remote locations if categorical attributes indicate that users are logging in after permissible log in hours when remote. In another example, the system can suggest that all devices that are used to access a particular database use a higher level of authentication in response to detecting anomalous activity (e.g., high level of access requests) with respect to the database.

FIG. 3 is a flowchart of an example method 300 of counterfactual analysis, which is an example embodiment of the identifying step 220 in FIG. 2. The example method 300 comprises a step 305 of removing at least a portion of the data instances. For example, data instances associated with a device on a network can be removed. Next, the example method 300 includes a step 310 of regenerating anomaly scores for each of the data instances over the continuous time intervals. Next, a determination is made in step 315 if the regenerated anomaly scores are improved (e.g., by the removal that used "counterfactual" processing) compared to the anomaly scores. If the anomaly scores are improved (e.g., variances in anomaly scores are removed and the anomaly scores are substantially consistent with one another), then at least a portion of the categorical attributes are identified as anomalous categorical attributes and a cause of the anomalous activity in step 320 of the example in FIG. 3. Stated otherwise, an improvement in an anomaly store is a lower score (e.g., the deviation is less unusual), according to various embodiments.

If the anomaly scores are not improved, the example method 300 returns to step 305 and a second portion of the categorical attributes are removed and steps 310 and 315 are repeated. This process may continue until a cause or causes of an anomaly are determined. In various embodiments, the system 105 allows for multiple causes of an anomaly, i.e. it is possible that two distinct categorical attributes both contribute to the anomaly, and the system 105 will report each cause. The system 105 can order the attributes in such a way that testing can terminate when the system 105 locates an attribute which doesn't "cause" an anomaly. The system 105 can compute a positive score for how influential a categorical attribute is, with zero meaning not influential at all.

The counterfactual processing, in various embodiments, e.g., as used in step 220 and method 300, comprises efficiently subtracting components from a behavioral profile (e.g., analysis of the input stream) until the component contributing to the unusual behavior is isolated and located.

In some embodiments, the systems and methods can utilize a regularity analysis rather than a counterfactual analysis. In various embodiments, the regularity analysis comprises identifying when a specific categorical attribute of the set of categorical attributes influences the anomaly score for the data instances if an output of an anomaly detection algorithm is approximately identical for alternative cases in which all the data instances with that specific categorical attribute exist.

Figure 4:
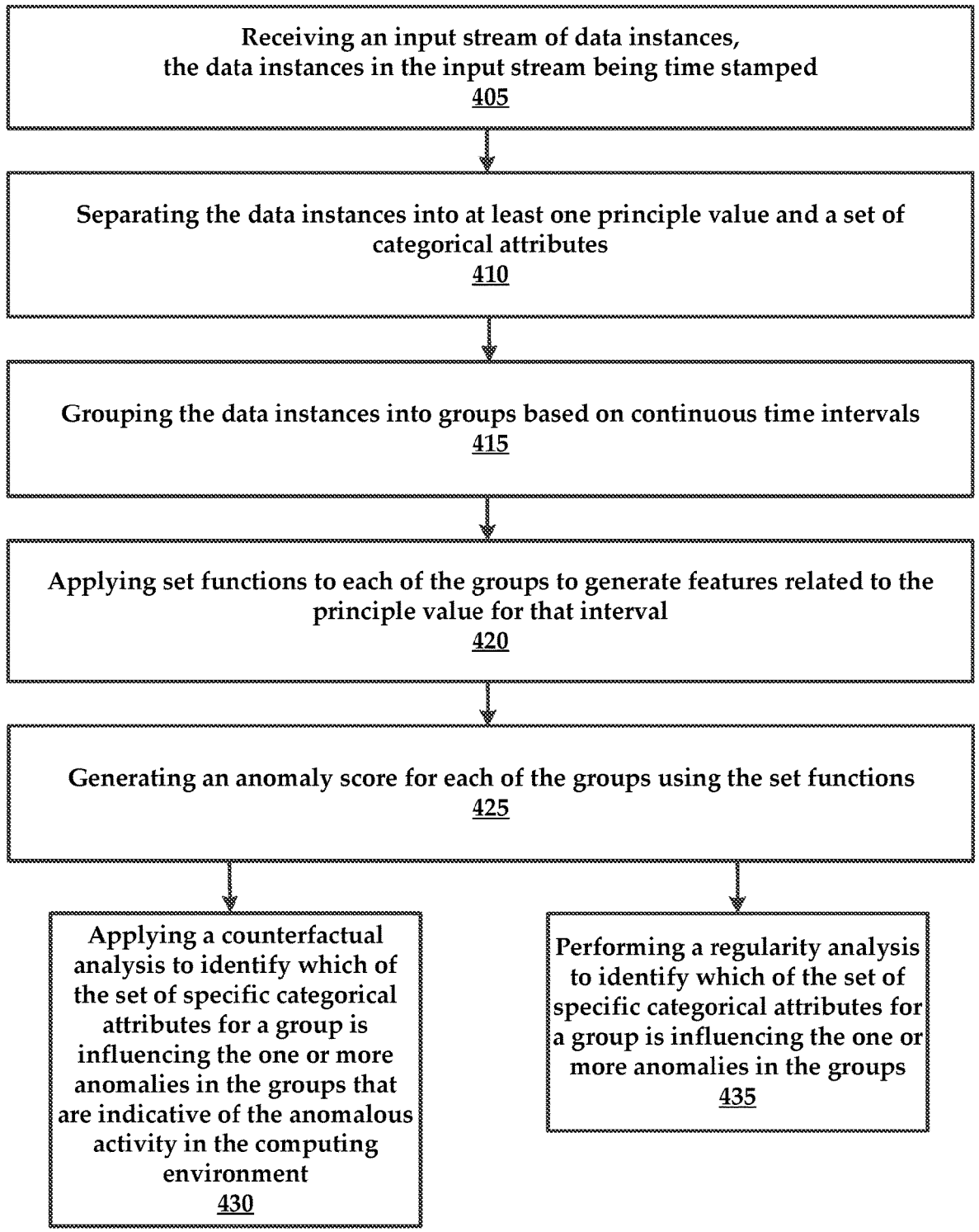
FIG. 4 is a flowchart of another example method of anomaly and causation detection.

FIG. 4 is a flowchart of another example method, example method 400, of anomaly and causation detection according to various embodiments. The example method 400 includes a step 405 of receiving an input stream of data instances. In various embodiments, the data instances in the input stream are time stamped. The example method 400 includes a step 410 of separating the data instances into at least one principal value and a set of categorical attributes, as well as a step 415 of grouping the data instances into groups based on continuous time intervals. It will be understood that, in various embodiments, each of the continuous time intervals has a length that represents a duration of the interval.

Next, the example method 400 includes a step 420 of applying set functions to each of the groups to generate features related to the principal value for that interval, and a step 425 of generating an anomaly score for each of the groups using an anomaly detection algorithm.

In some embodiments, the example method 400 comprises either (or both) a step 430 of applying a counterfactual analysis to identify which of the set of specific categorical attributes for a group is influencing the one or more anomalies in the groups that are indicative of the anomalous activity in the computing environment; or a step 435 of performing a regularity analysis to identify which of the set of specific categorical attributes for a group is influencing the one or more anomalies in the groups.

Some embodiments disclosed herein can, but are not required to implement counterfactual processing. Also, some embodiments, such as the following embodiments, contemplate the use of unstructured log files in anomaly detection. In more detail, the input stream of data instances used in an analysis can include unstructured log files or data streams. These unstructured log files and/or individual data instances are time stamped, the exact classification or composition of data instances may not be readily ascertainable without additional information or analysis. The present disclosure provides a means for taking these unstructured log files and converting them into an input stream that is useful for anomaly detection.

Also, it will be appreciated that while classification of unstructured log files is useful for anomaly detection, the systems and methods disclosed herein are also useful for more general time series analysis methods as well. For example, it can be used for computing device forecasting such as predicting log data occurrences over the next week, or summarization such as providing a clear condensed view of the types of data that exist in a log file.

The present disclosure includes embodiments that are configured to obtain the unstructured log files and covert the same into input that is valuable for anomaly detection. The present disclosure provides methods and system for classifying and grouping unstructured data instances together in order to convert the unstructured data instances into a format that is usable for anomaly detection.

For context, a large percentage of monitored output (e.g., input stream of data instances) that is received from a computing environment will be received as unstructured data. Generally described, unstructured data is defined as data that is obtained from a computing environment, where the unstructured data is not in a format that is utilizable in anomaly detection. If the monitored data of a computing environment is unstructured, it is possible that relevant data (e.g., data that would be indicative of an anomaly) in the input stream may go undetected. The resultant anomaly detection processes that use these erroneous input streams may result in deleterious effects, such as increases in malware distribution or poor computing environment performance.

Also, requiring system administrators and/or application developers to output computing environment data in a format that is acceptable for anomaly detection may be onerous or performed improperly.

The problem of unstructured log files is unique to computing technologies. Each computing system has a unique permutation of software, firmware, hardware, network configurations, and so forth that generate unstructured log files (e.g., input streams). Even variances between individual computing environments can result in the computing environments creating unstructured log files that are dissimilar. Thus, a need is present for systems and methods that can utilize machine learning to convert these unstructured log files into a format that is acceptable for anomaly detection. Again, a large proportion of log data from computing environments is unstructured. Unstructured logs are difficult, if not impossible to understand, summarize, visualize or analyze without post-processing. Generic processes for adding structure via parsing is time consuming and error prone. In response, the systems and methods herein utilize field time search extraction and UI visualization based on machine learning as compelling tool for managing and converting unstructured log files. These systems and methods can reverse engineer and categorize contents of an unstructured log file. In general, these systems and methods take advantage of an inherent property of many unstructured log files, which is that word ordering in log files is generally a predictive and repeatable metric. For example, a network traffic log will present the same types of content fields in a particular order based on an application that generates the network traffic log. That is, log files typically possess repeating patterns of data, although the values of these patterns of data may vary.

In general, these methods comprise an analysis phase that is performed on received unstructured log files. In some embodiments, unstructured log files comprise a time stamp and unstructured text. Machine learning is used to classify the unstructured text prior to anomaly detection. In various embodiments, the process of classifying comprises grouping and characterizing the unstructured test data so as to provide the structure necessary for anomaly detection. Based on the classifications, anomaly detection algorithms are performed on the converted or structured log files. In some embodiments a dashboard is also provided to the user to provide understanding and visualization of the unstructured logs file for identification of anomalous unstructured log files.

In some embodiments, the machine learning-based classification processes disclosed herein can assist in supporting additional data analysis and filtering tools such as grok filter. Thus, the machine learning classification can be used to seed and maintain the input to a grok filter. In some embodiments, the machine learning capabilities disclosed herein for classifying unstructured log files provides a set of candidate patterns for categorical messages. However, machine learning will not know what entity is represented by a token. For example, a token may be a user or a host. Thus, some embodiments contemplate manual intervention to add this context. Thus, the classified output of machine learning in this disclosed can be used to 'seed' grok pattern creation where the machine learning patterns can be augmented and edited by users.

Generally speaking, the present disclosure allows for the conversion of unstructured log files by machine learning processes that include, but are not limited to, classification of unstructured data that also includes content grouping and characterization. Once the unstructured data has been converted into a structured format, the methods of anomaly detection disclosed above, with or without the counterfactual processing can be used to determine anomalies.

While some embodiments are utilized for time-series anomaly detection and forecasting, some embodiments disclosed herein can also be utilized for operations such as outlier data detection, data imputation analyses, data clustering, and other similar operations.

Figure 5:
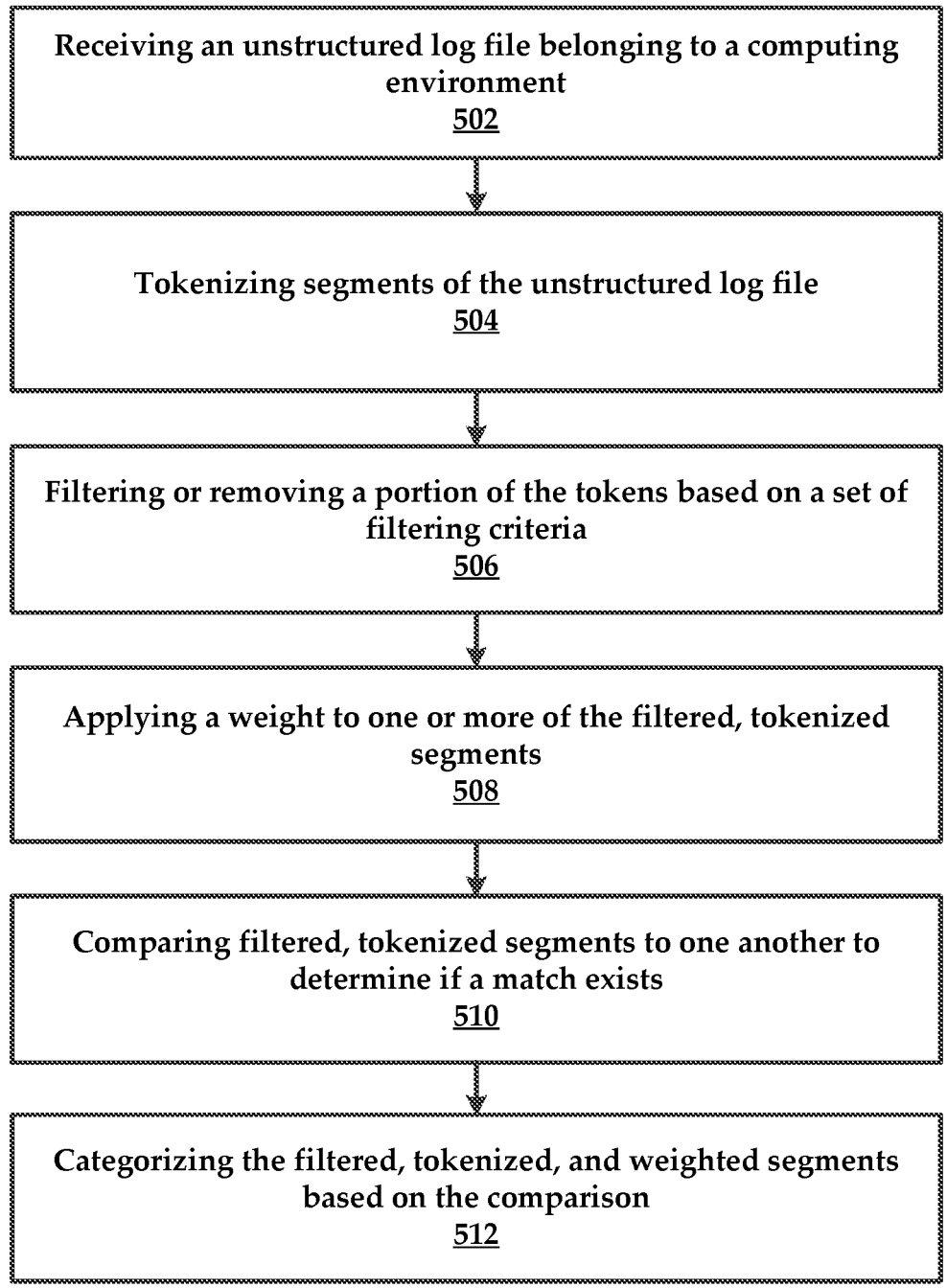
FIG. 5 is a flowchart of an example method for categorizing the contents of an unstructured log file and using the same for anomaly detection in a computing environment.

FIG. 5 illustrates an example method of processing an unstructured log file into a form that is usable for anomaly detection.

According to some embodiments, the unstructured log file conversion processes disclosed herein allow for grouping of "similar" messages together into categories. Machine learning processes are implemented to essentially reverse engineering unstructured log statements, which allows for grouping and classification. Advantageously, the use of a training dataset is permissible but not required as machine learning is utilized across the entire the unstructured log file.

Broadly, the conversion of an unstructured log file to a structured representation that can be utilized for anomaly detection can include steps such as tokenization, filtering, weighting, comparing, category assigning, and category defining—just to name a few. To be sure, the unstructured log file is not required to be converted or transformed into a structured log file per se, but the contents of the unstructured log file are processed through categorized and/or grouping so as to be usable in an anomaly detection process.

Also, it will be understood that even without unstructured log file categorization the systems and methods disclosed herein can be configured to perform anomaly detection on an overall event rate. Unstructured log file categorization allows for more granularity in terms of determining the types of messages that are anomalous, and also identifying anomalies such as rare messages that may be lost in overall detection.

Initially, an unstructured log file belonging to a computing environment is received in step 502. In general, the unstructured log file includes the output of a computing process. Examples include a runtime software log file, a hardware log file, network traffic, or any other log file that would be generated in or by a computing environment or a component thereof. It will be understood that the unstructured log file is time stamped. In some processes, data instances inside the unstructured log file are individually time stamped. In other embodiments, each data instance in the unstructured log file is assigned or attributed the time stamp of the unstructured log file. In general, the unstructured log file is associated with temporal data that is indicative of a time frame for the data instances within the log file.

Next, segments of an unstructured log file are tokenized in step 504. With regard to tokenization, a set of tokenization rules are implemented to initially identify sets of characters in the unstructured log file. In one embodiment, the tokenization rules involve breaking a message down into segments or words. A message could include an entire unstructured log file or a portion of an unstructured log file. In some embodiments, only certain components of a message are tokenized. For example, letters and numbers are tokenized while whitespaces or blank entries are not tokenized. Other characters such as underscores, dots, hyphens, and punctuation are individually evaluated. Underscores are not tokenized if at the beginning or end of a message, but are tokenized if present elsewhere. Dots are not tokenized if at the beginning or end of a message, but are tokenized if present elsewhere. The same rules apply for hyphens as those that apply to underscores and dots. Other types of punctuation are not tokenized.

The following examples are segments that would be tokenized based on the rules: started; starting; David; packets_sent; www.prelert.com; gb030976; and prelert-solaris. Again, the tokenization configurations and rules can be tuned as desired, or could be adapted based on feedback into the system. For example, if certain information that is not tokenized or is excluded, the rules can be adjusted to ensure that these data are correctly identified.

Additionally, in some embodiments, once tokens are identified, the method includes a step 506 of filtering or removing a portion of the tokens based on a set of filtering criteria. In some embodiments, filtering rules will remove from consideration a portion of the tokens generated in the prior steps. While tokenization removes a portion of unwanted data from the unstructured log file, the filtering process can further refine or strip data. In one embodiment, tokens corresponding to numbers (up to and including base 16; including dots) are filtered out. Also, tokens corresponding to date words such as January, February, Wednesday, etc. are filtered out. Next, tokens corresponding to numbers with trailing units, such as 10214K, are filtered out.

In some embodiments, the filter can be tuned to exclude or remove other field names based on user-defined input. In various embodiments, filter enhancements can be utilized that account for binary-to-text encoding schemes such as base 64, or a length heuristic plus character frequencies. Other enhancements allow for SQL truncated statements, usernames and/or hostnames, or user-defined and configurable filtering.

Heuristics apply on a case-by-case or type basis. In an example use case that considers Base 64 encoded data blobs, it will be understood that tokens will likely be long and will use a specific character set. Therefore, to detect tokens which are encoded strings the system is configured to exclude strings less than a certain character count and to check for strings which only contain characters from an appropriate set.

In addition, character frequency histograms are a useful feature vector for identifying a variety of data types. When incorporating this into the filtering process the system will use pre-trained classifiers for data types that the system is intended to identify. These would be provided to the user with the product and the user would select one (or more) from a list to add to a given filtering specification, based on their understanding of the data types present in their log files.

In some embodiments, because the system may not possess, a-priori the complete list of possible data types this is not a case of choosing between a set of alternatives. As such the system can allow for the possibility that a token isn't one of the defined types or is ambiguous. False positives are particularly damaging for this case (since the token would be removed) and this would be reflected by the system in the training objective. The plan is, using a corpus of training data comprising a diverse set of example log files, to train a collection of binary classifiers that identify if a token belongs to a given type, for example, SQL fragment, Base 64 encoded blob, and so forth. These would be trained to strongly penalize FP at the expense of FN, i.e. a given classifier will only suggest a category if it is confident. Then, the system will test each token against the collection of selected classifiers and identify it as having a given type only if it is unambiguous.

As part of this process the system will evaluate the viability of this approach by examining how well the classifier generalizes across our corpus. Only classifiers for data types that have good error characteristics on the test set would be provided to end users. As a possible refinement the system can be configured to train margin classifiers on combinations of possible data types and use these (if the margin is large) to decide between ambiguous types suggested above.

FIG. 6 illustrates an example unstructured data segment 600 from an unstructured log file that is tokenized 602, and filtered 604.

Next, the method can include a step 508 of applying a weight to one or more of the filtered, tokenized segments. That is, the segments of the unstructured log files have been both tokenized and then filtered to produce the filtered, tokenized segments. In general, it is presumed that tokens/words that can be found in a dictionary are more likely to define a category than non-dictionary tokens. It is also presumed that parts of speech, such as verbs are more important to categorization than other parts of speech. A dictionary can include any collection of defined terms such as a traditional dictionary, a technical dictionary such as a user manual, or other similar knowledgebase or definitional authority.

FIG. 7 illustrates an example weighting of filtered, tokenized segments 702 and 704. In this example, weightings are applied as follows: info has a weighting of (3) three; service has a weighting of (3) three; IA_FTSPOS has a weighting of (1) one; starting has a weighting of (6) six; and started has a weighting of (6) six.

Next, the method includes a step 510 of comparing segments to one another to determine if a match exists. FIG. 8 illustrates an example comparison between two segments 802 and 804. Filtered tokens 806 and 808 are created using example rules set forth above. While being similar in appearance, the only comparison match by position is the "A" character when filtered tokens 806 and 808 are compared.

In some embodiments, segment analysis can be improved using distance matching techniques such as Levenshtein distances. In general, these "distance" represent how many changes are required to transform one set of characters into a match for a second set of characters. For example, only one character change or transposition is required to convert 'cat' into 'mat'.

Using the Levenshtein distances principle, the systems and methods can be adapted to calculate Levenshtein distance with an "alphabet" consisting of tokens rather than letters. This process includes determining how many single token edits are needed to change one token sequence to another. For example, the segment service starting is transposed to service started by one token replacement. Thus, using the filtered tokens 806 and 808 above, "A TCPCOM2 AJBSVC2 Connected to remote" is converted or transposed to "A AJBSVC4 Connected to remote" by two operations (one delete operation; one replace operation).

In general, each insert or delete operation costs the token weight. Also, each replacement costs the higher of the replaced and replacement token weights. For example, service starting is transposed to service started with a score of six since a verb was replaced. In another example, "A TCPCOM2 AJBSVC2 Connected to remote" is transposed to "A AJBSVC4 Connected to remote" using two operations of one deletion of a non-dictionary word and replacement of a non-dictionary.

In general, if the "distance" between two segments is small, it may be inferred that these filtered, tokenized segments are close enough to one another to consider them to be a match, despite the differences/distances.

In some embodiments, the systems will be configured to cluster strings using a distance metric that is tailored for log messages then automatically extract regular expressions that uniquely match each cluster. In some embodiments, a Levenshtein distance is calculated on alphabet of tokens $T=\{t\_i\}$. In some instances, custom weightings are applied for verbs, as these parts of speech are most important. In some embodiments, a sampling technique can be utilized that attempts to maximize a probability of sampling every distinct message class with fixed maximum space. In particular, the systems sample a message with probability proportional to its distance to nearest message in sample set and evict with a probability inversely proportional to its distance to nearest message.

In some embodiments, a clustering technique is utilized that is suitable to apply to pairwise distances. Also, a user is allowed to write custom regular expressions to partition the data, which are preserved by the clustering performed by the systems of the present disclosure. In some embodiments, the systems disclosed herein can automatically extract a sequence of tokens $\{(t\_1^{\wedge}((i)), t\_2^{\wedge}((i)), \ldots, t\_n^{\wedge}((i)))\}$ which uniquely identifies each cluster i and map them to regular expressions $\{t\_1^{\wedge}((i))).*t\_2^{\wedge}((i)).* \ldots *t\_n^{\wedge}((i))\}$.

After the steps disclosed above, the method can then begin a categorization process in step 512 of the method of FIG. 6. In some embodiments, this process can include searching through a corpus or database of known categories. This can be done on a token-by-token basis. In one or more embodiments, the search for a category can terminate if a category is found where a weighted edit distance is less than 15% of total token weight. A match can be accepted as a "best match" among categories where a weighted edit distance is less than 30% of total token weight. FIG. 10 illustrates an example best match weighting selection data set. The initial data instances 1002 are defined into categories 1004 based on weighting.

While these thresholds are based on empirical data, these thresholds can be adjusted as desired and/or as feedback into the system when a matching heuristic is used within the machine learning. It will be understood that the thresholds selected should not result in all tokens, segments, or messages being placed into one single category. When a match does not fall within the specified thresholds, a new category can be created. In some embodiments, the categories that are available for matching are based on examples provided to the system, reverse engineering of the original segment/message content, regular expressions, and so forth.

Again, these methods provide for advantages. For example, no training data is required in order to classify the contents of an unstructured log file. The heuristics and feedback into the machine learning of the system ensure that the system learns over time in order to improve classification and other processes such as tokenization, weighting, matching, and so forth. Also, the system enables real-time analytics in certain scenarios. For example, an event such as detection of a completely new category can considered an anomaly that would trigger a real-time notification and/or adjustment of a classification model used by the system. In another example, detection of a high event rate of a category considered an anomaly. For example, if the unstructured log file is processed according to the methods above, and the unstructured log file is related to network traffic data, a large spike in network traffic data can be flagged as an anomaly. The unstructured log file could be raw network traffic data obtained from a network resource, such as a DNS server, a network switch, or a cloud.

Figure 9:
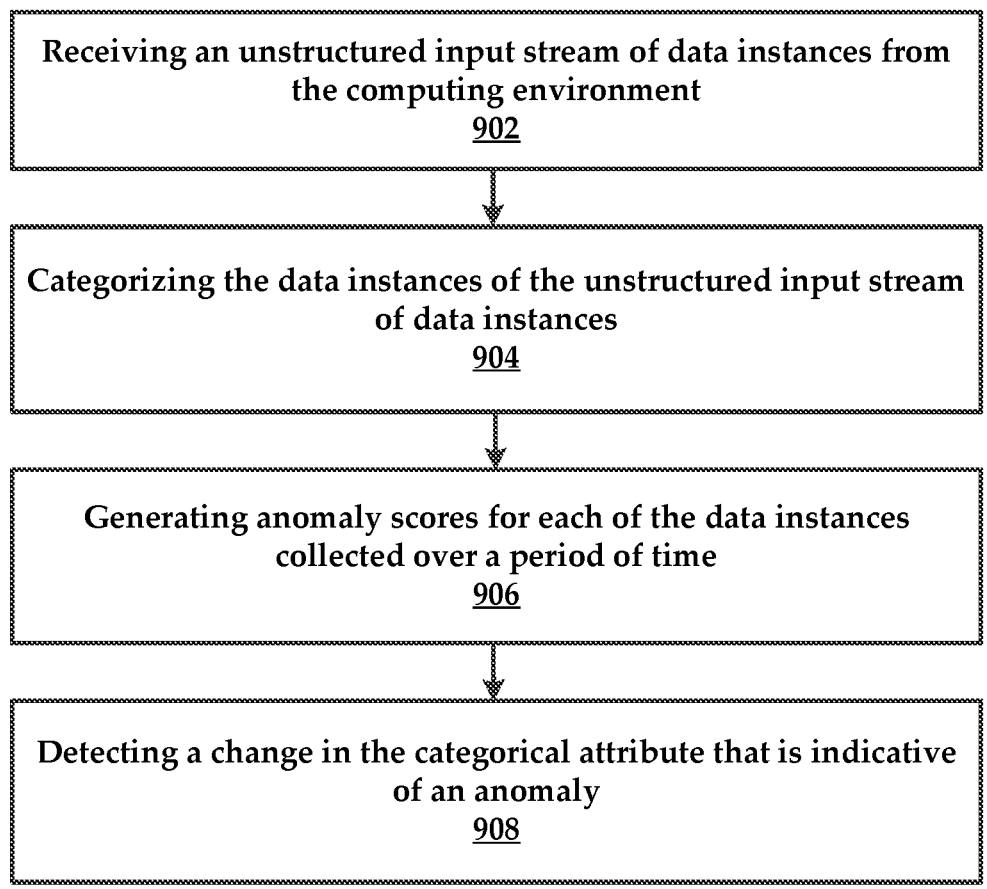
FIG. 9 is a flowchart of an example method that classification of an unstructured log file message/segment in combination with an anomaly detection method.

FIG. 9 is a method of anomaly detection that employs unstructured log file analysis disclosed above. In some embodiments, the method includes a step 902 of receiving an unstructured input stream of data instances from the computing environment. Again, the unstructured input stream is time stamped or the contents thereof are individually time stamped.

Next, the method can include a step 904 of categorizing the data instances of the unstructured input stream of data instances. As noted above, the data instances comprise any of at least one principal value or the categorical attribute. In some embodiments, the principal value is determined to be a categorical attribute. With respect to unstructured log file categorization, a principal value may be a categorical attribute determined through machine learning. In some embodiments, multiple principal values and/or associated categorical attributes can be present in an unstructured log file and determined through machine learning.

In some embodiments, the categorizations are determined through machine learning techniques.

In one or more embodiments, the method includes a step 906 of generating anomaly scores for each of the data instances collected over a period of time. This can include any of the anomaly score generation processes disclosed herein. When the anomaly scores are evaluated and changes occur, the system can be triggered to begin a process or method of determining which of the one or more categorical attributes are causing the change in anomaly scores. As noted above, this process can include counterfactual processing or any other evaluation as disclosed herein.

Thus, the method includes a step 908 of detecting a change in the categorical attribute that is indicative of an anomaly.

In more detail, the systems and methods disclosed herein can generate anomaly scores for data instances in a temporal bucket (e.g. a five min window or other selectable period of time), and then evaluate the categorical attribute(s) that influenced the anomaly. Additional details on anomaly detection can be found in U.S. patent application Ser. No. 15/498,406, which is hereby incorporated by reference herein in its entirety, including all references and appendices cited therein. In some embodiments, in addition to the anomaly detection disclosed in the '406 application, the systems and methods disclosed herein can augment data instances with a new categorical attribute due to the classification of the unstructured data into categories.

Again, the disclosure above related to collectively to FIGS. 5-9 can be equally applied to any of the methods for anomaly detection disclosed herein. That is, while some embodiments comprise an input stream that is time stamped and the input stream can comprise structured data, other embodiments allow for the use of unstructured data such as an unstructured log file. Prior to evaluation of the values and attributes included in the unstructured log file, the contents of the unstructured log file are categorized and extracted using the methods disclosed above. Thus, after processing the unstructured log file to categorize the content included therein (e.g., data instances), this categorized content can then be evaluated as provided above to determine values, attributes, and the like. These values can be compared with respect to a time frame to determine anomalies in the data included in the unstructured log file, which is in turn indicative of anomalies in the computing environment.

Figure 11:
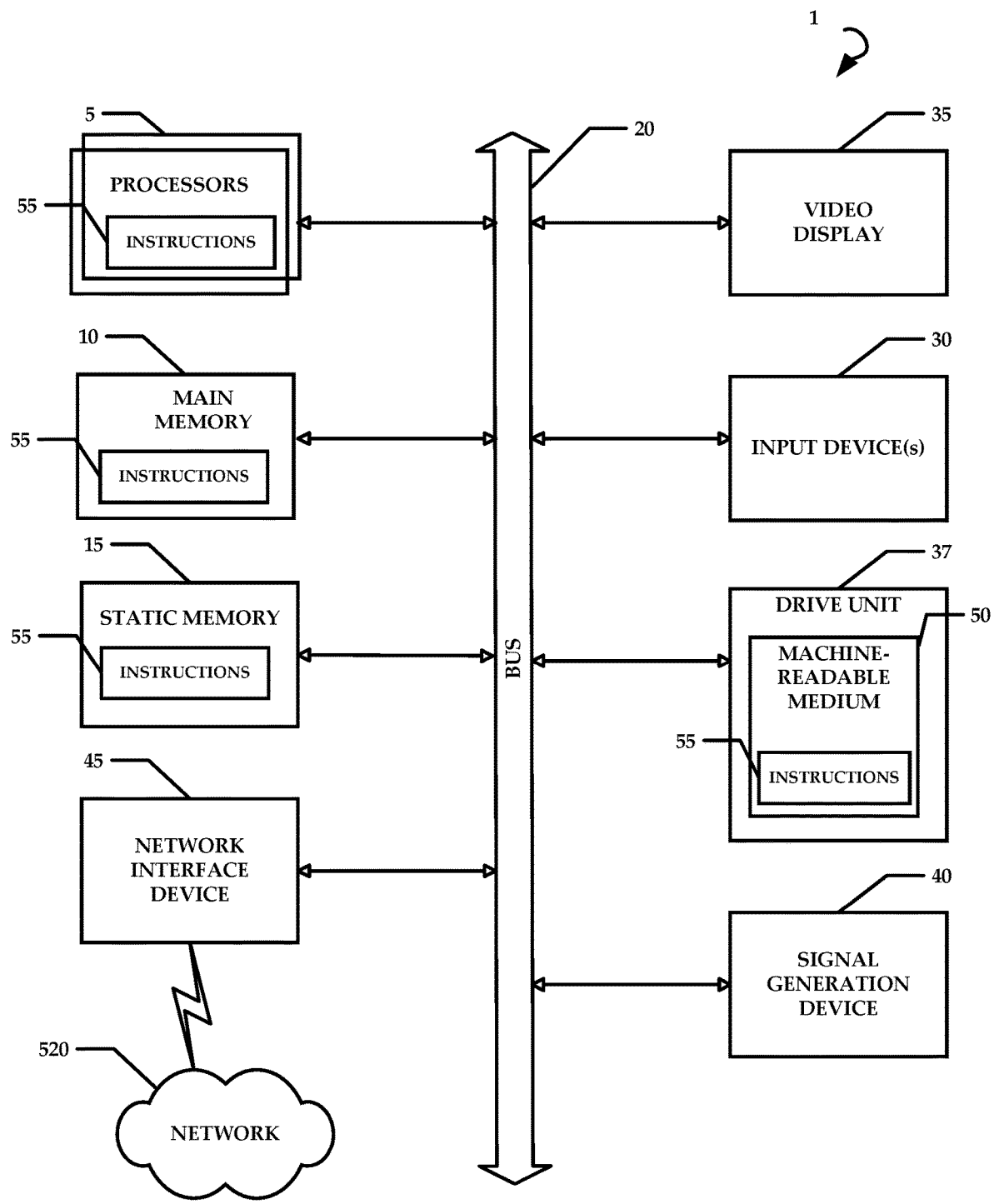
FIG. 11 is a schematic diagram of a computing system that is used to implement embodiments according to the present technology.

FIG. 11 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include input device(s) 30 (also referred to as alpha-numeric input device(s), e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a machine-readable medium 50 (which may be a computer readable medium) on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 150 or network 520, see FIG. 1 and FIG. 5, respectively) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A computer-implemented method for detecting anomalous activity in a computing environment, the method comprising:
   receiving an unstructured input stream of data instances from the computing environment, the unstructured input stream being time stamped;
   categorizing the data instances of the unstructured input stream of data instances, the data instances comprising at least one principal value and at least one categorical attribute, each of the at least one categorical attribute being an equivalence class determined through unsupervised machine learning based on a weighted edit distance, the use of the unsupervised machine learning occurring without using predetermined or pre-configured metrics for assessing the data instances of the input stream;

removing one or more data instances corresponding to the at least one categorical attribute, the removed data instances originating from a suspected source device accessible to the computing device over a network;

generating anomaly scores for remaining ones of each of the data instances collected over a period of time;

examining the anomaly scores and locating variances in the anomaly scores that are indicative of an anomaly, comprising detecting a change in the anomaly scores over time for the data instances; and restricting access to, or operations by, the computing environment in response to the detection of the anomaly, wherein:

the change in anomaly scores is performed using a counterfactual analysis comprising regenerating the anomaly scores for each of the data instances over the continuous time intervals;

wherein if the regenerated anomaly scores are improved compared to the anomaly scores, at least a portion of the at least one categorical attribute is each identified as an anomalous categorical attribute and a cause of the anomalous activity.

2. The method of claim 1, wherein categorizing the data instances of the unstructured input stream of data instances comprises:

tokenizing segments within the unstructured input stream;

filtering or removing a portion of the tokenized segments based on a set of filtering criteria;

applying a weight to one or more of the filtered, tokenized segments;

comparing the filtered, tokenized segments to one another to determine if a match exists therebetween; and categorizing the filtered, tokenized segments based on the comparison.

3. The method of claim 2, wherein when a match does not exist, a new category is created and attributed to one or more of the filtered, tokenized segments.

4. The method of claim 3, further comprising applying tokenization rules to exclude at least a portion of the segments of the unstructured log file.

5. The method of claim 4, further comprising applying filtering rules to remove tokenized segments corresponding to only numerical values or tokenized segments corresponding to date-related words, or tokenized segments corresponding to numbers with trailing units.

6. The method of claim 5, wherein comparing the filtered, tokenized segments to one another further comprises determining distances between the filtered, tokenized segments based on deletions and replacements, further wherein the distances between the filtered, tokenized segments indicates if a weighted number of operations relative to a total weight of the tokenized segments is within 15%.

7. The method of claim 1, wherein generating the anomaly scores comprises:

creating features for a current group of the data instances;

applying an anomaly detection algorithm that takes as inputs the features for the current group, and group features calculated using set functions for groups earlier than the current group; and generating the anomaly scores, the anomaly scores being indicative of how anomalous are the features for the current group.

8. The method of claim 1, further comprising enacting changes in the computing environment relative to at least a portion of the at least one categorical attribute to prevent future instances of the anomalous activity.

9. A computer-implemented method for detecting anomalous activity in a computing environment, the method comprising:

receiving an unstructured input stream of data instances, the data instances in the unstructured input stream being time stamped;

categorizing the data instances of the unstructured input stream of data instances, the data instances comprising at least one principal value and a set of categorical attributes, each of the categorical attributes being an equivalence class determined through unsupervised machine learning based on a weighted edit distance, the use of the unsupervised machine learning occurs without using pre-determined or pre-configured metrics for assessing the data instances of the input stream;

removing one or more data instances corresponding to the at least one categorical attribute, the removed data instances originating from a suspected device accessible to the computing device over a network;

grouping remaining ones of the data instances into groups based on continuous time intervals and at least one principal value, each of the continuous time intervals having a length;

applying set functions to each of the groups; and generating an anomaly score for each of the groups using the set functions;

restricting access to, or operations by, the computing environment in response to the detection of an anomaly based on the anomaly scores, wherein:

the change in anomaly scores is performed using a counterfactual analysis comprising regenerating the anomaly scores for each of the data instances over the continuous time intervals; wherein if the regenerated anomaly scores are improved compared to the anomaly scores, at least a portion of the at least one categorical attribute is each identified as an anomalous categorical attribute and a cause of the anomalous activity.

10. The method of claim 9, further comprising applying a regularity analysis to identify which of the set of categorical attributes for a group is influencing one or more anomalies in the groups that are indicative of the anomalous activity in the computing environment.

11. The method of claim 10, wherein generating the anomaly score further comprises applying an anomaly detection algorithm to values generated using the set function to detect changes in the groups over the continuous time intervals.

12. The method of claim 9, wherein the regularity analysis further comprises identifying when a categorical attribute of the set of categorical attributes influences the anomaly score for the set of categorical attributes if an output of an anomaly detection algorithm is within 30% to alternative instances in which the set of categorical attributes exists.

13. A computer-implemented method for anomaly detection, comprising:

receiving an unstructured log file of a computing environment, the unstructured log file comprising temporal data and data instances;

tokenizing segments within the unstructured log file;

filtering or removing a portion of the tokenized segments based on a set of filtering criteria, wherein the filtering excludes tokens comprising a particular character set and tokens less than a particular character count, the particular character set and the particular character count being based on a data type of the set of filtering criteria;

applying a weight to one or more of the filtered, tokenized segments;

comparing the filtered, tokenized segments to one another to determine if a match exists therebetween;

categorizing the filtered, tokenized segments based on the comparison, the categorizing comprising at least one categorical attribute, each of the at least one categorical attribute being an equivalence class determined through unsupervised machine learning based on a weighted edit distance, the use of the unsupervised machine learning occurring without using pre-determined or pre-configured metrics for assessing the data instances of the tokenized segments;

removing one or more data instances corresponding to the at least one categorical attribute, the removed data instances originating from a suspected device accessible to the computing device over a network;

generating anomaly scores for remaining ones of the data instances collected over a period of time;

examining the anomaly scores and locating variances in the anomaly scores that are indicative of an anomaly by detecting a change in the anomaly scores over time for the data instances; and restricting access to, or operations by, the computing environment in response to the detection of the anomaly, wherein:

the change in anomaly scores is performed using a counterfactual analysis comprising regenerating the anomaly scores for each of the data instances over the continuous time intervals;

wherein if the regenerated anomaly scores are improved compared to the anomaly scores, at least a portion of the at least one categorical attribute is each identified as an anomalous categorical attribute and a cause of the anomalous activity.

14. The method of claim 13, wherein when a match does not exist, a new category is created and attributed to one or more of the filtered, tokenized segments.

15. The method of claim 13, further comprising applying tokenization rules to exclude at least a portion of the segments of the unstructured log file.

16. The method of claim 13, further comprising applying filtering rules to remove tokenized segments corresponding to only numerical values or tokenized segments corresponding to date-related words, or tokenized segments corresponding to numbers with trailing units.

17. The method of claim 13, wherein comparing the filtered, tokenized segments to one another further comprises determining distances between the filtered, tokenized segments based on deletions and replacements, further wherein the distances between the filtered, tokenized segments indicates if they are within two operations to match.

* * * * *